United States Patent
Webster et al.

(10) Patent No.: US 7,882,765 B2
(45) Date of Patent: Feb. 8, 2011

(54) BALANCING ASSEMBLY

(75) Inventors: John R. Webster, Derby (GB); Ian C. D. Care, Derby (GB)

(73) Assignee: Rolls-Royce plc, London (GB)

( * ) Notice: Subject to any disclaimer, the term of this patent is extended or adjusted under 35 U.S.C. 154(b) by 1196 days.

(21) Appl. No.: 11/234,160

(22) Filed: Sep. 26, 2005

(65) Prior Publication Data

US 2006/0174725 A1 Aug. 10, 2006

(30) Foreign Application Priority Data

Sep. 29, 2004 (GB) ................. 0421576.0

(51) Int. Cl.
*H02K 7/02* (2006.01)
*F16F 15/32* (2006.01)
(52) U.S. Cl. ............. 74/572.1; 74/572.11; 74/574.2
(58) Field of Classification Search ........ 74/572.1, 74/572.11, 574.1; 310/51, 261, 74, 81, 153, 310/156.75
See application file for complete search history.

(56) References Cited

U.S. PATENT DOCUMENTS

| 5,543,670 A | * | 8/1996 | Luecke | .......... 310/26 |
| 5,676,025 A | | 10/1997 | Lulay | |
| 5,724,862 A | | 3/1998 | Hannah | |
| 5,757,662 A | | 5/1998 | Dyer | |
| 5,816,115 A | | 10/1998 | Taylor | |
| 6,210,099 B1 | | 4/2001 | Hugbart | |
| 6,606,922 B2 | * | 8/2003 | Case et al. | ......... 464/180 |
| 2003/0089193 A1 | | 5/2003 | Altieri | |

FOREIGN PATENT DOCUMENTS

| DE | 3 042 543 AB | 7/1982 |
| DE | 197 11 726 AB | 10/1998 |
| DE | 10116869 AB | 10/2001 |
| EP | 0 604 391 A2 | 5/1990 |
| EP | 0 604 391 A3 | 6/1994 |
| EP | 1 156 314 A | 11/2001 |
| JP | 60225041 AB | 11/1985 |
| JP | 2 190 732 AB | 7/1990 |
| JP | 2 292 171 AB | 12/1990 |
| JP | 3 019 766 AB | 1/1991 |

* cited by examiner

*Primary Examiner*—Richard W Ridley
*Assistant Examiner*—Daniel Yabut
(74) *Attorney, Agent, or Firm*—Jeffrey S. Melcher; Manelli Denison & Selter PLLC

(57) ABSTRACT

A balancing assembly for a rotor comprises a mass, a displacement arrangement for displacing the mass along a guide arrangement. The guide arrangement extends circumferentially and the displacement arrangement can move the mass circumferentially around the principal axis of the rotor during rotation of the rotor.

19 Claims, 7 Drawing Sheets

BALANCING ASSEMBLY

FIELD OF THE INVENTION

This invention relates to balancing assemblies for rotors. More particularly, but not exclusively, the invention relates to balancing assemblies for use in gas turbines, for example on fans, compressors and/or turbines of gas turbine engines.

BACKGROUND OF THE INVENTION

During the operation of a gas turbine engine, operational changes such as foreign object damage, wear, blade movements and differential expansion effects can cause the rotary components of the engine to become unbalanced. Small changes to the balance can significantly affect the operation of the system, where seal rubs and significant performance degradation can result. The effects on the balance cannot be corrected until the next balancing operation.

SUMMARY OF THE INVENTION

According to one aspect of this invention, there is provided a balancing assembly for a rotor, the assembly comprising a mass, a displacement arrangement for displacing the mass relative to the rotor, and a guide arrangement for guiding the displacement of the mass, wherein the guide arrangement extends circumferentially and the displacement arrangement can move the mass circumferentially around the principal axis of the rotor during rotation of the rotor.

According to another aspect of this invention, there is provided a balancing assembly for a rotor, the assembly comprising a mass, a displacement arrangement for displacing tile mass relative to the rotor and a guide arrangement for guiding the displacement of the mass, the guide arrangement extending circumferentially and the displacement arrangement being capable of moving the mass circumferentially around the principal axis of the rotor during rotation of the rotor, characterised in that the mass comprises a deformable material, and the displacement arrangement comprises an actuator to deform the material and effect the aforesaid movement of the mass.

The balancing assembly may comprise a plurality of masses and each mass is preferably movable independently of the other mass. In one embodiment, the guide arrangement comprises one guide to guide all the masses. In another embodiment, the guide arrangement comprises a plurality of guides, each guide being provided to guide a respective mass. Preferably, the balancing assembly comprises first and second masses. The second embodiment may comprise first and second guides to guide the first and second masses respectively.

The, or each, mass may comprise a plurality of mass elements. Conveniently, the, or each, mass may comprise three mass elements. The mass elements may be arranged in a generally H-shaped configuration. Each mass element may be deformable by the actuator in sequence to effect the movement.

The guide arrangement may be provided in or on the rotor and may comprise a conduit extendable around the rotor, preferably concentrically therewith.

The displacement arrangement may be arranged around the guide arrangement, The displacement arrangement may comprise a plurality of actuators arranged in sequence around the guide arrangement to activate the, or each, mass.

In one embodiment, the, or each, actuator may comprise a magnetic actuator which may comprise an arrangement of magnets.

The magnetic actuator arrangement may comprise one magnet, or a plurality of magnets mounted around the guide arrangement. Where the magnetic actuator arrangement comprises a plurality of magnets, the magnets are preferably circumferentially spaced along the guide arrangement. The magnets may be equispaced or irregularly spaced.

The, or each mass, may comprise a magnetic material. The magnetic material may be a magnetic shape memory material, or magnetostrictive material, whereby the shape memory material deforms under a magnetic field thereby being displaced relative to the guide arrangement.

The, or each magnet may be a permanent magnet or an electro magnet. In one embodiment the, or each, magnet may be a horseshoe magnet.

In another embodiment, the, or each, actuator may comprise an electric actuator arrangement, which may comprise an arrangement of electric circuits.

The electric actuator arrangement may comprise an electric circuit or a plurality of electric circuits arranged around the guide arrangement. Where the electric actuator arrangement comprises a plurality of electric circuits, the electric circuits are preferably substantially circumferentially spaced around the guide arrangement. The electric circuits may be equispaced or irregularly spaced.

The, or each, mass may comprise a piezoelectric material, actuatable by the, or each, electric circuit to deform and effect the aforesaid movement.

The balancing assembly may comprise three or more masses.

In one embodiment, the masses may be elongate and may extend around a major proportion of the guide arrangement. In this embodiment, the masses may extend around the guide a greater distance than the gaps between adjacent masses. In another embodiment the masses may extend around a minor proportion of the guide arrangement. In this embodiment, the masses may extend around the guide a distance which is less than the distance between adjacent masses.

In another embodiment the displacement arrangement may comprise an array of magnets arranged one after the other along the guide, The magnets are preferably electromagnetic, and may be actuatable one after the other along the guide arrangement to move the, or each, mass in a direction opposite to the direction of movement of the field at said mass.

According to another aspect of this invention, there is provided a method of balancing a rotor, comprising providing a mass, providing a displacement arrangement on the rotor for displacing the mass relative to the rotor, and providing a guide arrangement for guiding the displacement of the mass, wherein the guide arrangement extends circumferentially, and can guide the mass circumferentially around the principal axis of the rotor and the method includes displacing the mass along the guide by the displacement arrangement during rotation of the rotor.

According to another aspect of this invention there is provided a method of balancing a rotor, comprising providing a mass, providing a displacement arrangement on the rotor for displacing the mass relative to the rotor, and providing a guide arrangement for guiding the displacement of the mass, the guide arrangement extending circumferentially, and can guide the mass circumferentially around the principal axis of the rotor, characterised in that the mass comprises a deformable material, and the method comprises operating the displacement arrangement to actuate the deformable material to deform and effect the aforesaid movement of the mass.

The method may comprise providing first and second masses and may further comprise moving each mass independently of the other. In one embodiment, the guide arrangement comprises one guide to guide both masses. In another embodiment, the guide arrangement comprises first and second guides, each guiding a respective mass.

The method may further involve providing the guide arrangement in or on the rotor. The guide arrangement may comprise a conduit extending axially from the rotor. The displacement arrangement may be arranged around the guide arrangement.

In one embodiment, the displacement arrangement may comprise an actuator to actuate the, or each mass. The, or each, actuator may comprise a magnetic actuator arrangement and the method may involve applying a magnetic field to the guide arrangement. The magnetic actuator arrangement may comprise an arrangement of magnets.

The magnet actuator arrangement may comprise one magnet, or a plurality of magnets, mounted around the guide arrangement.

The mass may be formed of a magnetic material. The mass may be a magnetic shape memory material, or a magnetostrictive material. The method may involve actuating the magnet arrangement to deform the mass to provide said displacement.

Where the magnet arrangement comprises a plurality of magnets, the method may comprise arranging the magnets circumferentially spaced from each other around the guide arrangement. The magnet may be equispaced from each other or irregularly spaced from each other.

The displacement arrangement may comprise a plurality of magnets arranged one after the other along the guide. The magnets may be electromagnetic, and the method preferably comprises actuating the magnets sequentially in a first direction to create a magnetic field moving in the first direction, whereby a mass at said field is moved in a second direction opposite to the first direction The method may further involve actuating the magnets sequentially in the second direction to create a magnetic field moving in the second direction, whereby a mass at said field is moved in the first direction.

In another embodiment, the, or each, actuator may comprise an electric actuator arrangement, which may comprise an arrangement of electric circuits.

The electric actuator arrangement may comprise an electric circuit or a plurality of electric circuits arranged around the guide arrangement. Where the electric actuator arrangement comprises a plurality of electric circuits, the electric circuits are preferably substantially circumferentially spaced around the guide arrangement. The electric circuits may be equispaced or irregularly spaced The, or each, mass may comprise a piezoelectric material, actuatable by the, or each, electric circuit to deform and effect the aforesaid movement.

The method may involve actuating the mass to effect a change of shape of the parts of the mass.

The plurality of mass elements of the mass may be actuated in turn, for example by electricity or magnetism, to effect a change in shape of the respective mass element.

Each mass may comprise a plurality of mass elements, which may be arranged in an H-shaped configuration, and may comprise first and second outer mass elements which can engage the guide arrangement to secure the mass to the guide arrangement. The mass may comprise a third central connecting element.

The method may comprise actuating the first outer mass element to effect a change in shape thereon. The change in shape may comprise contracting in one dimension to disengage the first outer mass element from the guide arrangement.

The method may further comprise actuating the third central mass element to effect a change in shape of the third central mass element. The change in shape may comprise expanding the third central mass element in one dimension to move the first outer mass element.

The method may further comprise actuating the second outer mass element to effect a change in shape thereof. The change in shape may comprise contracting in one dimension to disengage the second outer mass element from the guide arrangement.

The method may comprise de-actuating the first outer mass element, whereby the first outer mass element expands to engage the guide arrangement Before the second outer mass element is actuated, the method may comprise de-actuating the third central mass element, whereby the third central mass element can contract to move the second outer mass element.

After the third central mass element is de-actuated, the second outer mass element may be de-actuated, whereby the second outer mass element engages the guide arrangement.

Desirably, the mass is moved substantially fully to the balancing position.

BRIEF DESCRIPTION OF THE DRAWINGS

Embodiments of the invention will now be described by way of example only, with reference to the accompanying drawings, in which.

DETAILED DESCRIPTION OF THE INVENTION

Figure 1:
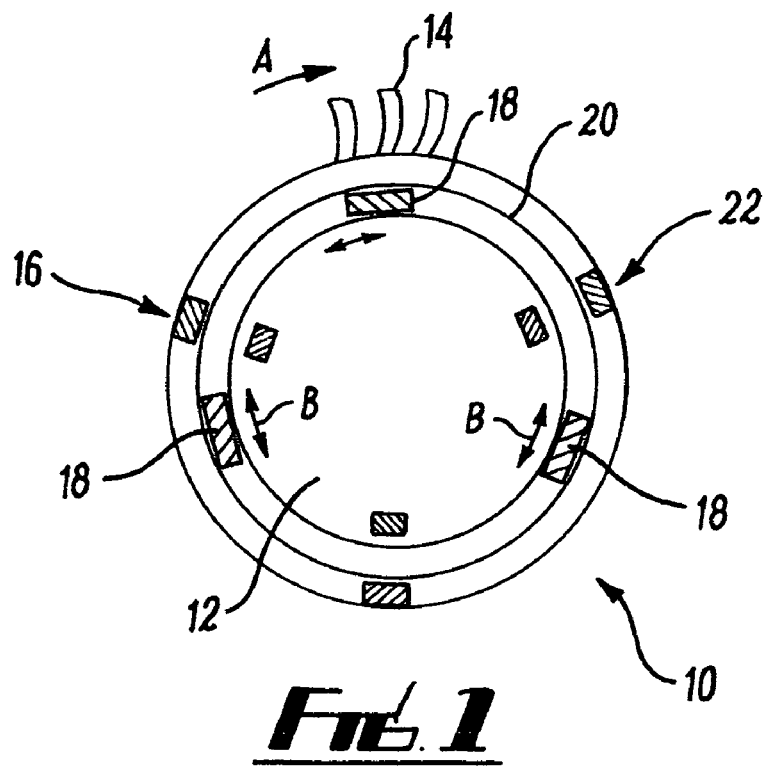
FIG. 1 is a schematic end view of a rotor incorporating an embodiment of a balancing assembly.

Referring to the drawings, FIG. 1 shows a schematic diagram of a rotor 10, for example a turbine or compressor, for example in a gas turbine engine. The rotor 10 comprises a disc 12 upon which are mounted a plurality of blades 14, only three of which are shown for clarity.

The rotor 10 is provided with a balancing assembly 16 comprising first and second masses 18 arranged in a guide arrangement 20 which extends circumferentially around the disc 12. The balancing arrangement also includes a displacement arrangement 22 for displacing the masses 18 along the guide arrangement 20 relative to the rotor 10. The displacement arrangement 22 is stationary and is arranged around the guide arrangement 20. The rotor 10 rotates in the direction of the arrow A, and the masses 18 can be displaced along the guide 20 in the direction indicated by the double headed arrows B.

Figure 2:
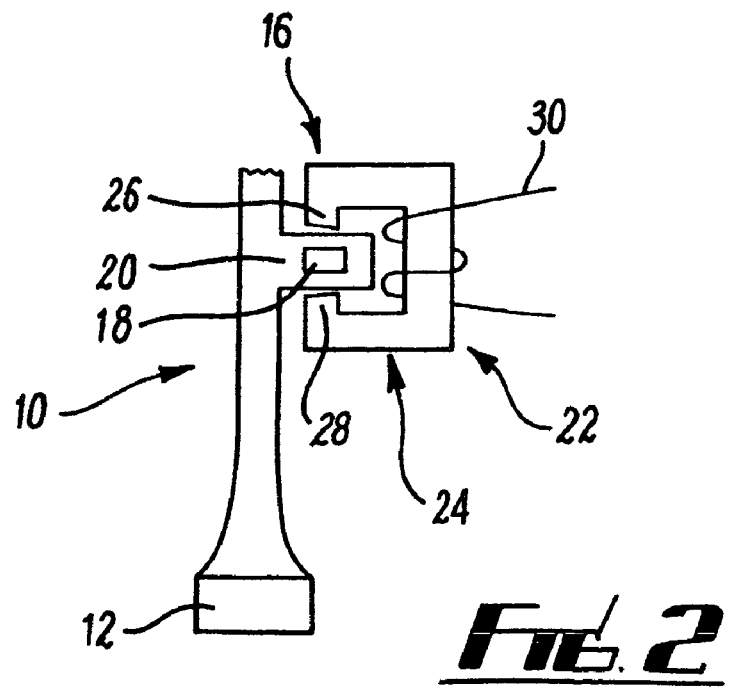
FIG. 2 is a diagrammatic sectional view of part of the rotor shown in FIG. 1.

Referring to FIG. 2, there is shown a sectional side view of part of the rotor shown in FIG. 1.

The displacement arrangement 22 shown comprises a horseshoe electromagnet 24 providing a first pole 26 radially outwardly of the guide 20 and a second pole 28 radially inwardly of the guide 20. Suitable electrical circuitry 30 is provided to actuate the electromagnet 24. The first and second poles 26, 28 will be either north and south poles respectively or south and north poles respectively, depending upon the direction of current flow through the circuitry 30.

Figure 3A:
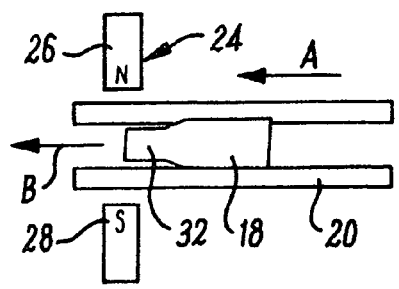
FIGS. 3A to 3E show the successive stages in the displacement of a mass relative to a displacement device.
Figure 3B:
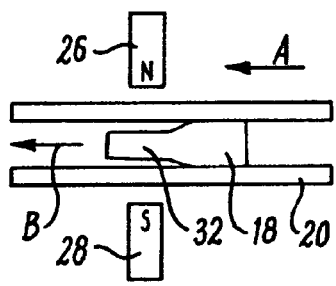
Figure 3C:
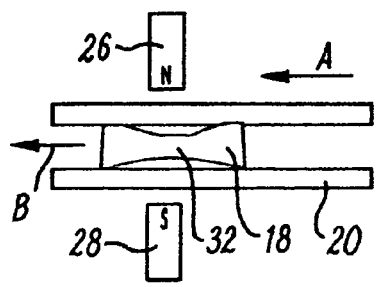

The masses 18 can be either formed of a magnetic shape memory material which is deformable in the magnetic field, a standard magnetic material which is non-deformable in a magnetic field, or magnetostrictive material. Where the masses 18 are formed of a standard magnetic material, the electromagnet 24 will cause movement of the masses 18 along the guide 20 in a direction opposite to the direction of rotation of the rotor 10.

Where the masses 18 are formed of a magnetic shape memory material, the magnet can be caused to move by the effect of the magnetic field in the same direction as the direction of rotation of the rotor 10. This is shown in FIGS. 3A to 3E. In FIG. 3A, the guide 20 is moved with the rotor 10 in the direction indicated by the arrow A. As the masses 18 formed of the magnetic shape memory material moves in to the magnetic field created by the electromagnet 24, the mass 18 starts to deform, undergoing longitudinal expansion wherein a forward portion 32 is caused to expand longitudinally and contract radially. FIG. 3B shows the position as the mass 18 moves further into the magnetic field and the deformed portion 32 at the forward end of the mass 18 lengthens. FIG. 3C shows the next position of the mass 18 in which the longitudinally expanded and radially contracted portion 32 is midway between the opposite ends of the mass 18.

Figure 3D:
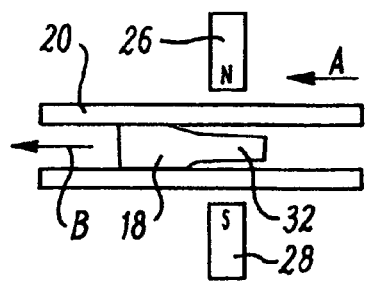
Figure 3E:
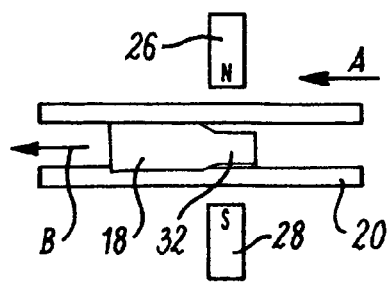

FIGS. 3D and 3E show the next two steps as the mass 18 passes through the magnetic field, in which the deformed portion 32 is now at the opposite end of the mass 18. As will be appreciated, with deformations to the mass 18 caused by the electromagnet 24 cause the electromagnet 24 to move relative to the guide 20 in the direction shown by the arrow B. The use of a plurality of magnets spaced around the guide 20 and the high speed of rotation of the rotor cause rapid movement of the mass 18 along the guide to the desired position. There will be a plurality of electromagnets 24 spaced around the guide 20, e.g. three electromagnets 24 as shown in FIG. 2. the electromagnets 24 can be switched on and off as the masses 18 move past to control the extent of movement of each mass 18.

The purpose of the balancing assembly 16 is to correct any imbalances in the rotor 10 which have occurred during operation of the rotor 10. This is effected by moving the masses 18 to appropriate positions around the rotor 10 such that they correct the system to restore the balance of the rotor 10. The calculations necessary in order to effect such correction to the balance are well known and will not be described in this specification. It would be appreciated by the skilled person how these calculations would need to be applied to a suitable control system to control the operation of the displacement device 22, thereby controlling the movement of the masses 18.

There is thus described a preferred embodiment of a simple and effective assembly for balancing a rotor.

Various modifications can be made without departing from the scope of the invention. For example, the number of magnets could be increased to three or more which would provided the advantage in a system which allows only movement of the masses 18 in a direction opposite to the rotation of the rotor to effect rapid movement of the masses to the appropriate position to correct the balance.

Figure 4:
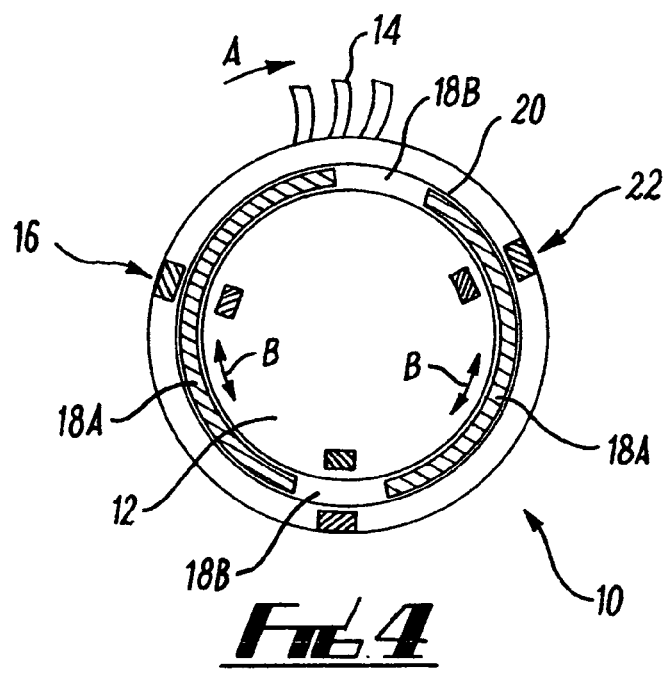
FIG. 4 shows a sectional side view of a rotor incorporating another embodiment of the balancing assembly.

In another embodiment, as shown in FIG. 4, the masses 18 can be replaced by two elongate masses 18A of appropriate magnetic material as described above. The two elongate masses 18A extend around a major proportion of the guide 20 and define gaps 18B in between. As can be seen, the gaps 18B are shorter than the masses 18A. By appropriate movement of the elongate masses 18A to desired positions the displacement device 22 the rotor 10 can be balanced. This would be advantageous in a flywheel application where weight and density are of benefit to the system.

Figure 5:
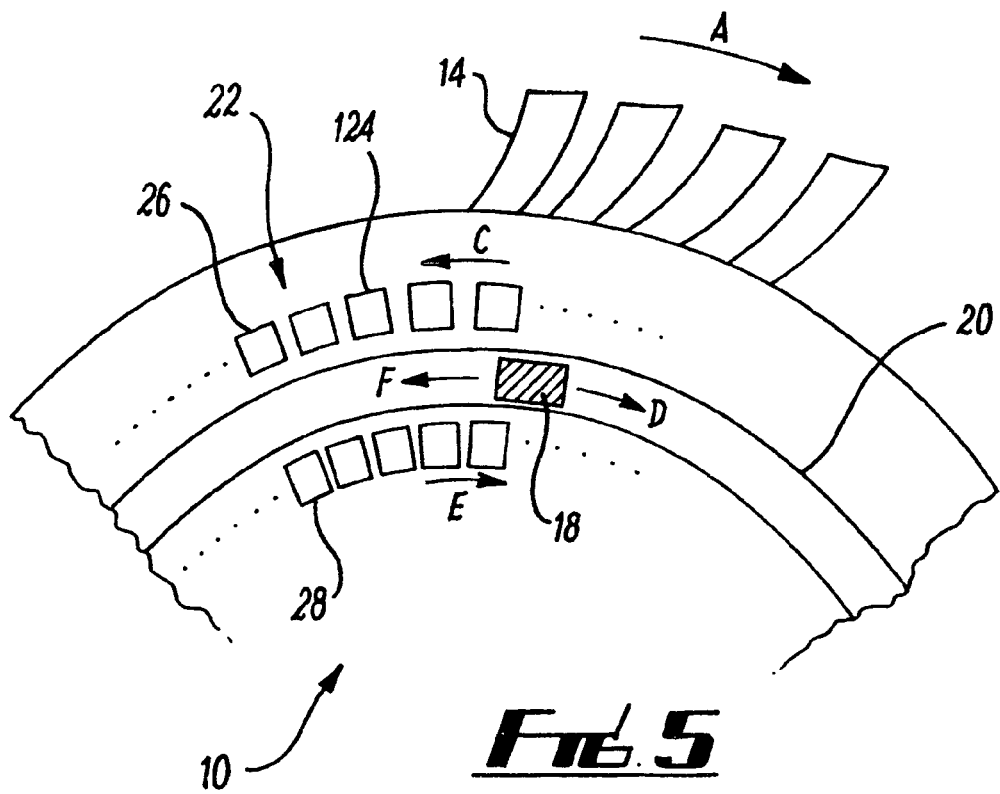
FIG. 5 shows a sectional side view of a rotor incorporating a further embodiment of a balancing assembly.

FIG. 5 shows a part of a rotor which incorporates a further modification of the balancing assembly, and the same features as shown in FIGS. 1-4 are designated with the same reference numeral. In the embodiment shown in FIG. 5, a plurality of electromagnets 124 are provided one after the other in a circumferential arrangement around the guide 20. Only five of the electromagnets 124 are shown. Each electromagnet 124 comprises a first pole 26 radially outwardly of the guide 20, and a second pole 28 radially inwardly of the guide 20. Each electromagnet 124 is electrically connected to a suitable control system which can control the actuation of each of the electromagnets 124. The electromagnets 124 can be switched on and then off sequentially such that the magnetic field travels around the guide 20. By actuating the magnet sequentially in the direction shown by the arrow C, the mass is moved in the direction shown by the arrow D. Alternatively, by actuating the electromagnets 124 in the direction of the arrow E, the mass 18 is moved in the direction of arrow F. The arrow A represents the direction of rotation of the rotor 10 and, therefore, the mass 18 can be moved either in the direction of rotation (arrow D) or in the opposite direction (arrow F).

The electromagnets 124 can be actuated sequentially to create a moving magnetic field in the direction in which the magnets are actuated. In order to create the magnetic field, the electromagnets 124 are switched on and off sequentially with appropriate phasing between the actuation of the magnets. The actuation of the magnets can be caused either by a single pulse of electricity or by the use of an AC input.

It is preferred that the movement of the masses should be in a direction to improve the balancing of the rotor. In embodiments where the masses 18 can be moved only in one direction, there may be occasions where the masses 18 have to be moved in a direction which would worsen the balancing of the rotor. With the embodiments shown in FIG. 1, the use of three masses 18 may enable movement of the masses 18 such that their movement always improves the balancing of the rotor. With the use of the embodiment shown in FIG. 5, the ability to move the mass in either direction along the guide 20 means that mass can be moved in a direction which will always improve the balance of the rotor.

Figure 6:
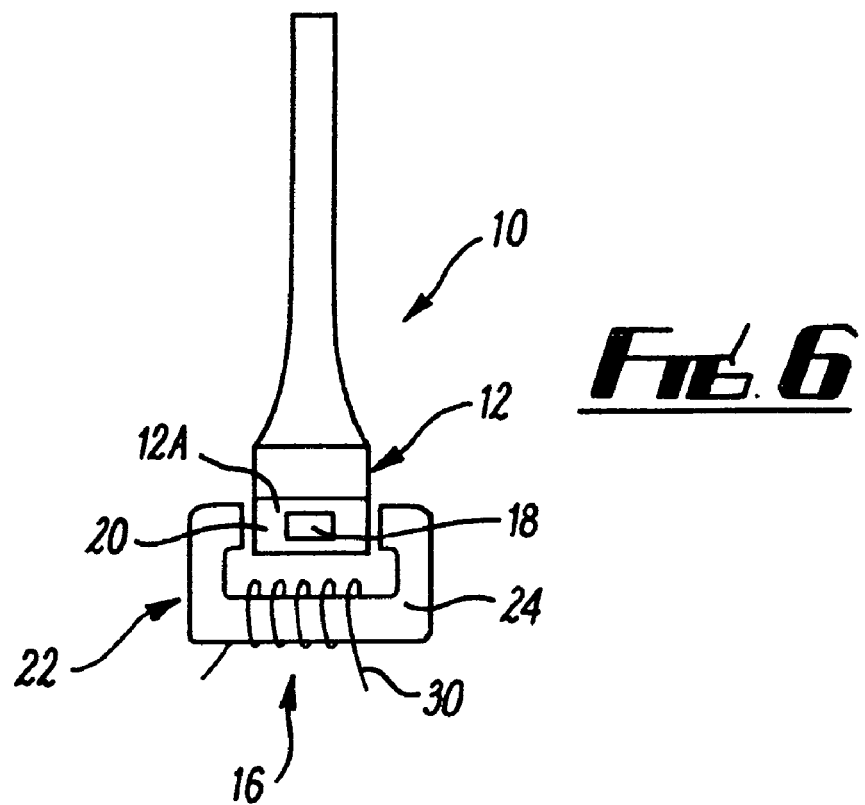
FIG. 6 is a diagrammatic sectional view of a rotor incorporating another embodiment of a balancing assembly.
Figure 7:
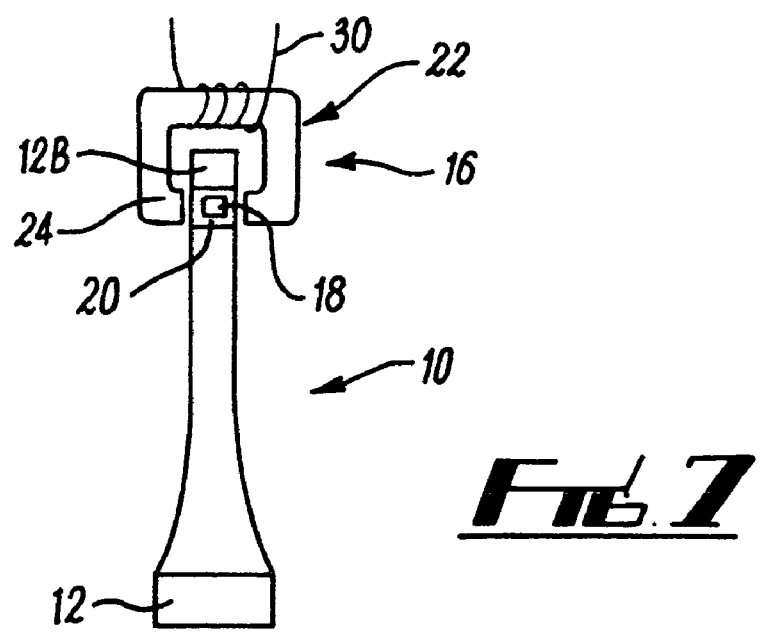
FIG. 7 is a diagrammatic sectional view of a rotor incorporating yet another embodiment of a balancing assembly.

FIGS. 6 and 7 are sectional side views of a rotor 10 incorporating further embodiments of a balancing assembly 16. In FIGS. 6 and 7 the balancing assembly 16 comprises many of the same features shown in FIG. 2 and these have been designated with the same reference numerals.

The embodiment shown in FIG. 6 differs from the embodiment shown in FIG. 2 in that the balancing assembly 16 is provided at the hub 12A of the disc 12, as shown.

The embodiment shown in FIG. 7 differs from those shown in FIGS. 2 and 6 in that the balancing assembly 16 is provided at the rim 12B of the disc 12, as shown.

A further embodiment is shown in FIGS. 8A to 8G, which show a sequence of stages in which the embodiment is utilised.

Figure 8A:
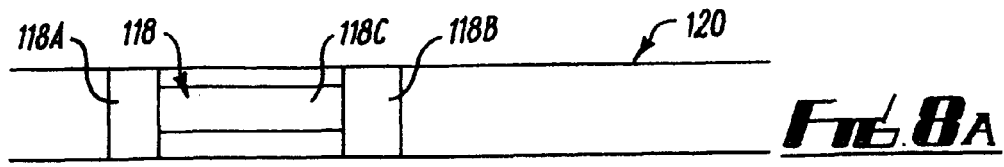
FIGS. 8A to 8G are diagrammatic representations of a sequence of stages in another embodiment of a balancing assembly.
Figure 8B:
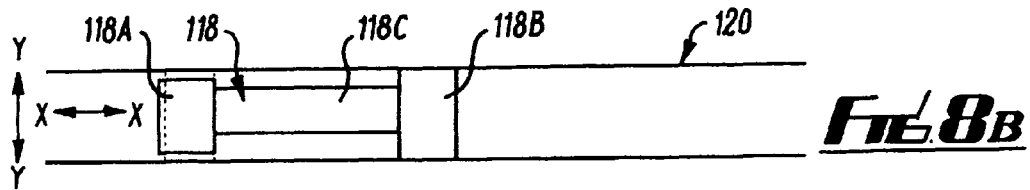
Figure 8C:
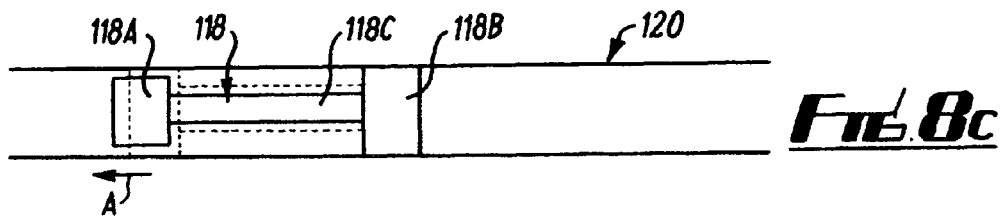
Figure 8D:
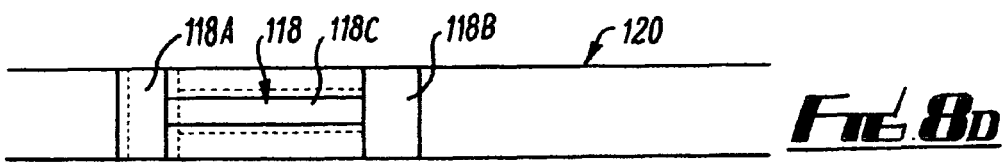

FIGS. 8A to 8G show a mass 118 formed of three mass elements, a first outer mass 118A, a second outer mass element 118B, and a third connecting mass element 118C. The mass elements 118A,B,C are formed of a magneto restrictive material when a magnetic field is applied to a magneto restrictive material, it changes shape. In the embodiment shown in FIGS. 8A to 8G, when a magnetic field is applied to the first outer mass element 118A, it changes shape such that it increases in dimension in the X-X direction as shown in FIG. 8B, but decreases in dimension in the Y-Y dimension also as shown in FIG. 8B. The effect of this is for the first outer mass element 118A to disengage itself on the walls of the tube 120.

When a magnetic field is applied to the first central mass element 118C is to decrease its dimension in the Y-Y direction, an increase of its dimension in the X-X direction. The effect of this is to push the first outer mass element 118A down the tube in the direction indicated by the arrow A in FIG. 8C. By removing the magnetic field from the first outer magnetic elements 118A, it expands in the Y-Y direction to engage the sides of the tube 120. The first outer mass element 118A also decreases in the dimension in the X-X direction.

Figure 8E:
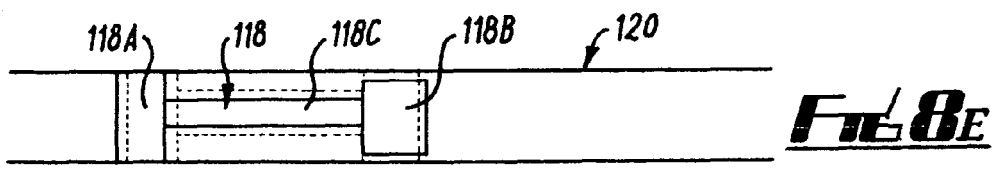
Figure 8F:
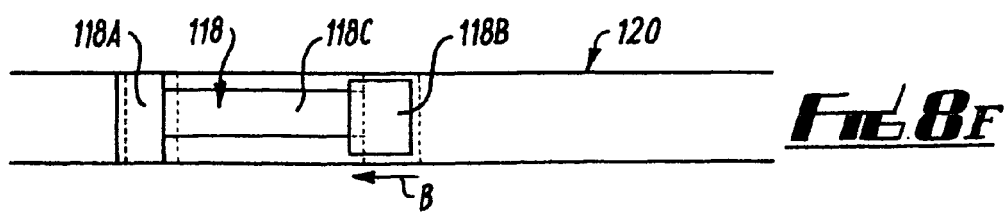
Figure 8G:
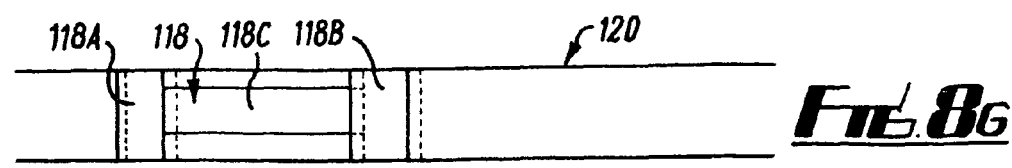

A magnetic field is then applied to the second outer mass element 118B, as shown in FIG. 8E thereby causing it to contract in the Y-Y direction. When the magnetic field is removed from the third connecting mass element 118C, it expands in the Y-Y direction and contracts in the X-X direction, thereby pulling the third outer mass element 118B in the direction indicated in the arrow B in FIG. 8F.

The magnetic field is then removed from the second outer mass element 118B allowing it to contract in the X-X direction and expand in the Y-Y direction thereby engaging against the sides of the tube 120. Thus, as can be seen by sequentially applying a magnetic field to the first outer mass element 118A in order, the mass 118 can be made to move along the tube 120.

It will be appreciated that the effect of moving the mass 118 along the tube 120 in the direction indicated by the arrows A and B could also be affected by arranging for the third central mass element 118C to contract when the magnetic field is applied thereto. By first applying the magnetic field to the second outer mass element 118B to cause it to contract in the Y-Y direction and then causing the third central mass element to contract, the second outer mass element 118B is pulled in the direction indicated in the arrow B, the magnetic fields can then be applied to the first outer mass element 118A which would contract in the Y-Y direction and then by allowing the third central mass element 118C to expand in the X-X direction it would push the first outer mass element 118A in the direction indicated by the arrow A. Movement of the mass 118 in the opposite direction could be affected by reverting the sequence of movement of the application of the magnetic field to the various components.

In order to effect the application of the magnetic field to the mass 118, arrangement similar to that shown in FIGS. 3A to 3E could be applied, but the magnetic field would be applied in an orientation which is at right angles to the orientation of the magnetic field in FIG. 3A to 3E.

Figure 9:
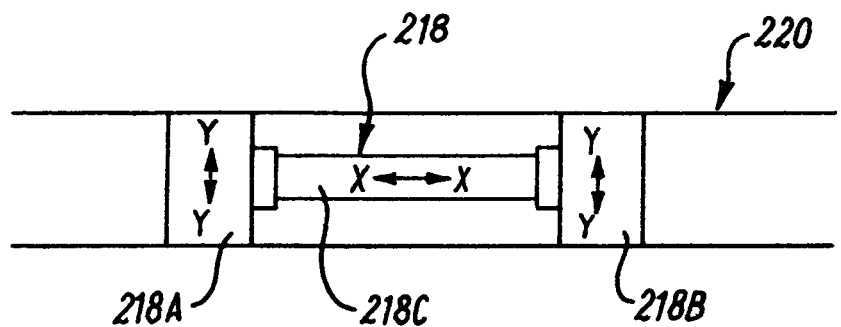
FIG. 9 is a diagrammatic representation of another embodiment of a balancing assembly.

Referring to FIG. 9, there is shown a mass element 218 which is formed of a piezoelectric material. The piezoelectric mass 218 is mounted in a tube 220 and comprises a first outer piezoelectric mass element 218A is arranged to contract in the Y-Y direction as shown. The piezoelectric mass 218 comprises a second outer mass element 218B which is also arranged to contract in the Y-Y direction as indicated. The piezoelectric mass element 218 also includes a third connector element 218C which is arranged to expand in the X-X direction as indicated.

Figure 10:
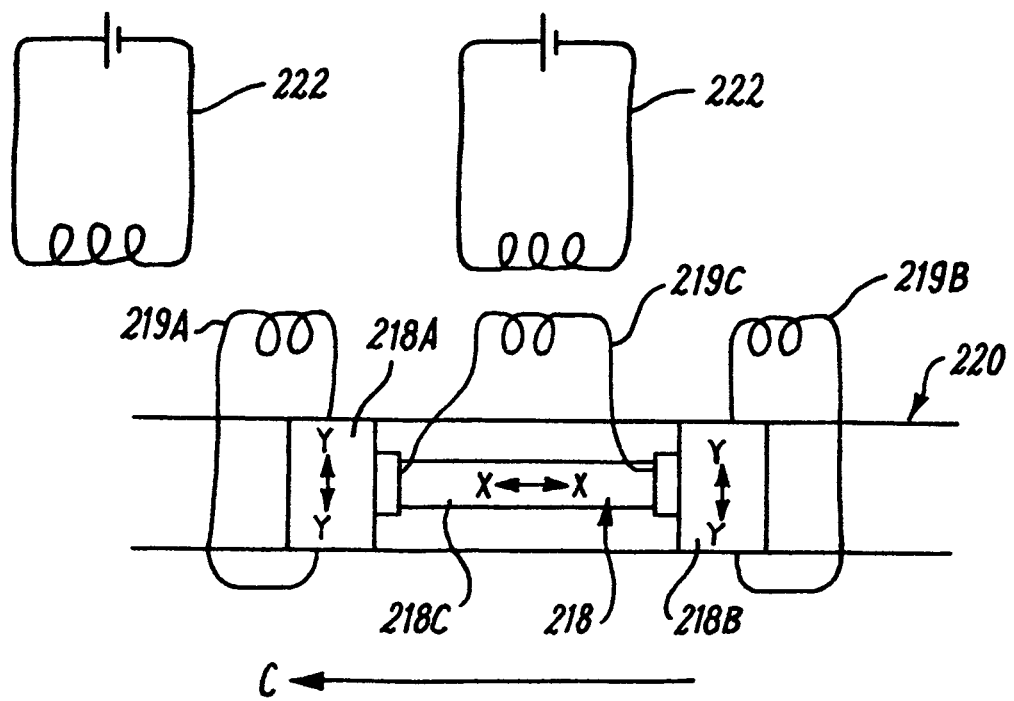
FIG. 10 is a diagrammatic representation of the embodiment shown in FIG. 9 showing an actuator arrangement.

FIG. 10 shows the arrangement shown in FIG. 9 but in which electric circuits 219A, 219B, 219C are connected respectively to the first, second outer and third central mass elements 218A, 218B and 218C. The arrangement of the coils 219A, 219B and 219C is shown diagrammatically in FIG. 10, but their precise arrangement would be understood by those skilled in the art.

An actuator in the form of a plurality of stationery excitation coils 222 are arranged adjacent each other around the annular tube 220. By actuating appropriate excitation coils 222 in sequence, the piezoelectric mass can be made to move along the tube 220 in the direction indicated by the arrow C.

One such way of causing the mass 218 to move along the tube 220 would be exciting the first coil 219A to cause the first piezoelectric outer mass element 218A to contract in a Y-Y direction and disengage itself from the tubes 220. An adjacent excitation coil 222 would then excite the first coil 219C thereby causing the third central piezoelectric mass element 218C to expand in the X-X direction thereby pushing the first piezoelectric mass element 218A in the direction indicated by the arrow C. The current in the first circuit 219A would then be switched off to allow the first piezoelectric mass element 218A to expand and engage the walls of the tube 220.

The stationery excitation coil 222 over the second circuit 219B would then excite the circuit 219B to cause the second outer piezoelectric mass element 218B to contract in a Y-Y direction.

By putting off the electric current through the third circuit 219C, the third piezoelectric mass element 218C would then contract in the X-X direction pulling the second outer piezoelectric mass element 218B in the direction indicated by the arrow C, By switching off the current in the third circuit 219B, the second outer piezoelectric mass element 218B would then expand in the Y-Y direction and engage the walls of the tube 220, Thus, by repeating the sequence, the piezoelectric mass element 218 can be made to move along the tube 220.

Figure 11:
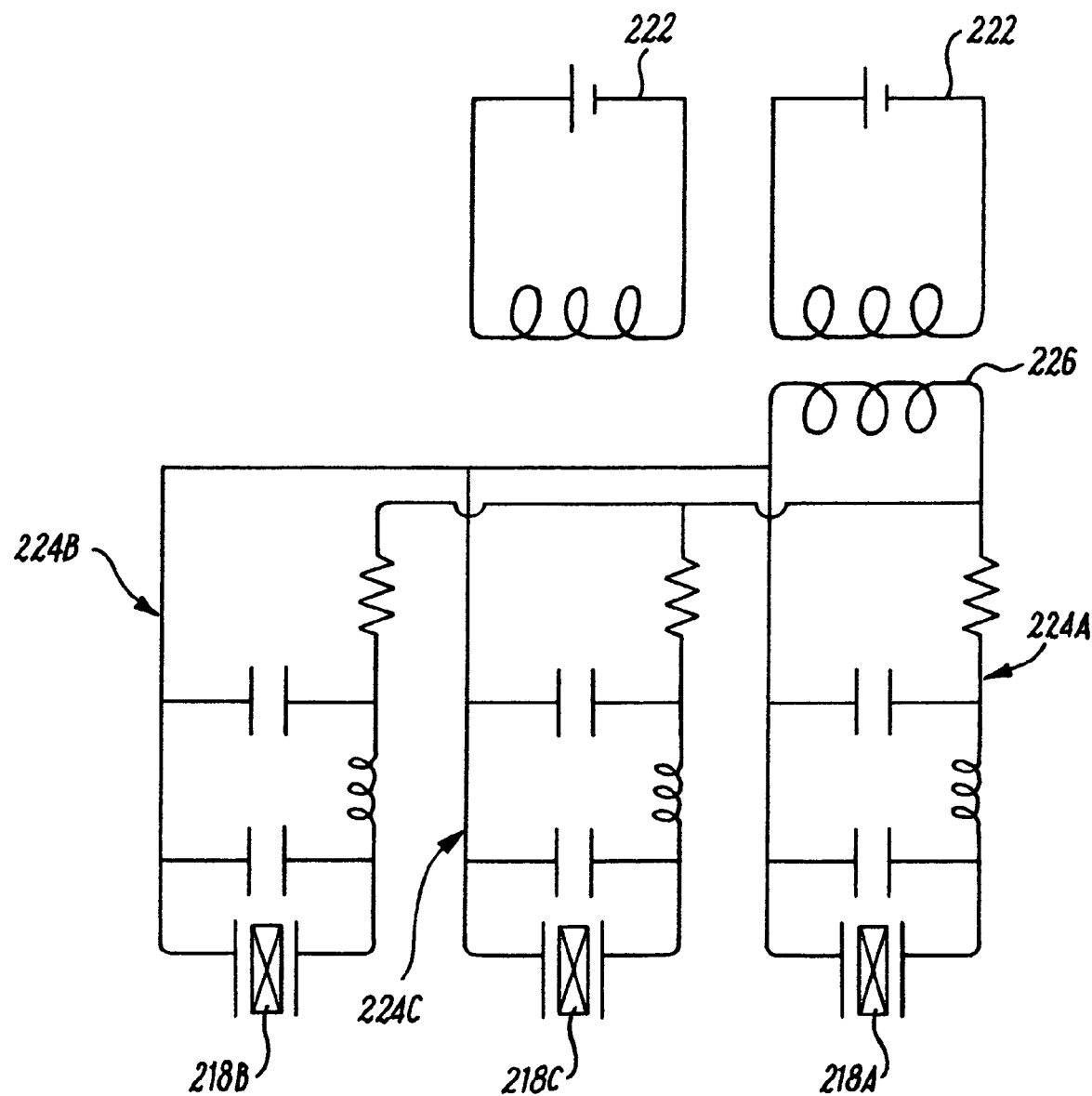
FIG. 11 is a diagrammatic representation of another actuator arrangement for the embodiment shown in FIG. 10.

As an alternative, and as shown diagrammatically in FIG. 11, the first, second and third circuits 219A, 219B and 219C can then be replaced by an arrangement of delay circuit, incorporating capacities 224 and resistors 226, as would be understood by persons skilled in the art. The first and second outer piezoelectric mass elements 218A, 218B, and the third central mass element 218C are represented schematically in FIG. 11. The piezoelectric mass elements 218A,B,C are connected by suitable delay circuits 224A, 224B and 224C.

The cool arrangement 224 includes a receiving coil 226 which is excited by the excitation coil 222. Again, it would be appreciated that there are a plurality of excitation coils 222 arranged around the guide arrangement.

When the excitation coil 222 is actuated, a current is induced in the receiving coil when then actuates the first delay coil 224 causing the appropriate contraction as described above in the first outer mass element 218A. By virtue of the selection of the components in the second and third delay circuits, electricity does not pass through the circuits 224B, 224C.

After the appropriate delay has passed, electricity then passes through the third delay circuit 224C to cause the expansion in the X-X direction of the third central piezoelectric mass element 218C. The delay circuit 224A then switches off the current in the first delay circuit 224A thereby allowing the first piezoelectric mass element 218A to expand and engage the walls of the tube 220. The delay circuit 224B then allows current to pass to the second outer piezoelectric mass element 218B causing it to contract in a Y-Y direction. The third delay circuit 224C then switches off the electricity allowing the third central piezoelectric mass element 218C to contract and pull the second outer piezoelectric mass element 218B towards the first outer piezoelectric mass element 218A. The second delay circuit 224B then switches off the electricity passing therethrough and the second outer piezoelectric mass element 218B then expands to engage the walls of the tube. This procedure can then be repeated using subsequent excitation coils 222 around the tube 220 until the mass element 218 reaches the desired position.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A balancing assembly for a rotor, the assembly comprising:
   at least one mass;
   a magnetic displacement arrangement for displacing the mass relative to the rotor; and
   a guide extending only circumferentially around a principal axis of the rotor, the at least one mass being movably contained by the guide, wherein the magnetic displacement arrangement is constructed to deform and displace the at least one mass along the guide only circumferentially around a principal axis of the rotor during rotation of the rotor; and wherein the, or each, mass is formed of a magnetic material; and wherein the magnetic material comprises a magnetic shape memory material, or a magnetostrictive material.

2. A balancing assembly according to claim 1, wherein the balancing assembly comprises a plurality of masses and each mass is movable independently of each other mass.

3. A balancing assembly according to claim 2, wherein the guide comprises one guide to guide all the masses.

4. A balancing assembly according to claim 1, comprising first and second masses.

5. A balancing assembly according to claim 1, wherein the guide is provided in or on the rotor and comprises a conduit extending concentrically around the rotor.

6. A balancing assembly according to claim 1, wherein the magnetic displacement arrangement is arranged around the guide.

7. A balancing assembly according to claim 1, wherein the balancing assembly comprises three or more masses.

8. A balancing assembly according to claim 1, wherein the mass comprises a deformable material and the magnetic displacement arrangement comprises an actuator to deform the deformable material and effect movement of the mass.

9. A balancing assembly according to claim 8 wherein the, or each, actuator comprises a magnetic actuator.

10. A balancing assembly according to claim 8 wherein the, or each, actuator comprises an electric actuator.

11. A method of balancing a rotor comprising:
    providing at least one mass;
    providing a guide extending only circumferentially around a principal axis of the rotor, the at least one mass being movably contained by the guide so that the at least one mass can only move along the guide; and
    displacing the mass relative to the rotor using a magnetic displacement arrangement, said magnetic displacement arrangement constructed to deform and displace the mass circumferentially around the principal axis of the rotor during rotation of the rotor using the guide.

12. A method according to claim 11, wherein the method comprises providing first and second masses and further comprises moving each mass independently of the other.

13. A method according to claim 11, wherein the method involves applying a magnetic field to guide the mass.

14. A method according to claim 13, wherein the mass is formed of a magnetic shape memory material, or a magnetostrictive material, and the method involves applying the magnetic field to deform the mass to provide said displacement.

15. A method according to claim 11 wherein the, or each, mass is moved substantially wholly to the balancing position.

16. A rotor incorporating a balancing assembly as claimed in claim 1.

17. A gas turbine engine incorporating a rotor as claimed in claim 16.

18. A rotor incorporating a balancing assembly as claimed in claim 11.

19. A gas turbine engine incorporating a rotor as claimed in claim 18.

* * * * *